United States Patent Office
3,434,879
Patented Mar. 25, 1969

3,434,879

PREPARATION OF THIN FILMS OF THE INTERMETALLIC COMPOUND NiAl

Robert C. Langley, Millington, N.J., assignor to Engelhard Industries, Inc., Newark, N.J., a corporation of Delaware No Drawing. Filed Sept. 29, 1965, Ser. No. 491,415
Int. Cl. B32b *15/20;* C23c *3/04;* C22c *19/00*
U.S. Cl. 117—227 3 Claims

ABSTRACT OF THE DISCLOSURE

Thin films of the intermetallic compound NiAl are prepared by coating a substrate with a solution of a hydrocarbon aluminum compound and an organo-nickel compound in amounts to provide an aluminum to nickel atomic ratio of about 1:1 and heating the coated substrate to decompose the organo-metallic compounds to deposit NiAl.

This invention relates to a method for the preparation of intermetallic compounds, and is particularly concerned with a novel method for the preparation of intermetallic compounds of aluminum and nickel.

Intimate mixtures of several metals are generally called alloys, and in these substances the metals may either be immiscible, or may form mixed crystals or solid solutions, or actual intermetallic chemical compounds may be present. The chemical properties of intermetallic compounds are often very different from those of their components, and this is particularly true of their resistance to corrosion. Intermetallic compounds are therefore of importance in certain applications for corrosion prevention, and in the form of thin films have known utility as oxidation preventive coatings. Further, intermetallic compounds are useful as diffusion barriers for preventing the diffusion of coatings, e.g. thin protective metal coatings applied for protective or decorative purposes, upon a metal substrate, into the metal substrate.

In accordance with the present invention, thin films of aluminum-nickel intermetallic compounds are prepared by coating a substrate which is stable at temperatures of 500 to about 1000° C. with a solution of a hydrocarbon aluminum compound and a soluble organo-nickel compound in an organic solvent, the aluminum and nickel being present in atomic ratio of about 1:1, and firing the coated substrate at an elevated temperature to deposit the intermetallic compound NiAl.

The hydrocarbon aluminum compound employed in the process of this invention has at least one carbon-aluminum bond, e.g. trialkyl aluminum, dialkyl aluminum hydride, triaryl aluminum and the like. The hydrocarbon aluminum compound is dissolved in an organic solvent, e.g. an aromatic solvent such as toluene, and to this is added a soluble organic nickel compound. Suitable nickel compounds include nickel carboxylates such as nickel resinate, nickel salts of fatty acids having from 10 to 20 carbon atoms in the molecule, e.g. nickel stearate, nickel tallates, nickel naphthenates, nickel octoates and the like. Nickel sulforesinates and nickel mercaptides having from 8 to about 20 carbon atoms in the molecule may also be used, and of the latter the nickel tertiary mercaptides are preferable because of their high solubility in organic solvents. Generally, the solution should contain from about 1 to about 5% aluminum, and sufficient nickel compound to provide the desired nickel:aluminum atomic ratio.

The solutions so prepared are unusually stable to air and moisture, and it apears that the nickel salt forms a complex with the hydrocarbon aluminum which is relatively inert to oxygen and water. The stability of such solutions makes it possible to apply them, as by brushing, upon suitable substrates in a non-protective atmosphere, i.e. without the need for careful exclusion of moisture and oxygen under normal handling conditions.

In order to develop the film of intermetallic compound, the nickel-aluminum solution deposited upon a substrate is heated in a non-oxidizing atmosphere to elevated temperature, e.g. from 500 to about 1000° C. Such heating is effected in a non-oxidizing atmosphere, preferably in the presence of hydrogen, for a period of time sufficient to decompose the organo metallic compounds and to produce a film of the intermetallic compound NiAl.

Intermetallic compounds deposited by the process of this invention have a metallic lustre and exhibit electron diffraction patterns typical of NiAl.

Example

To 1.6 gm. of a nickel resinate solution containing 2% by weight Ni in a solvent consisting of hexalin, toluene and oil of rosemary in equal parts by weight, was added 3.28 gm. of a toluene solution of triisohexyl aluminum containing 4.59% by weight of the aluminum alkyl. All handling of the separate solutions was done under nitrogen and nitrogen was bubbled through the final solution for agitation. The final solution which was stable in air contained 0.0144 gm. Al and .032 gm. Ni, a 1:1 atomic ratio.

Portions of the solution were applied in air to glass and to mica substrates and heated slowly in hydrogen up to 550° C., maintained at this temperature for ½ hour, and then gradually cooled in nitrogen to room temperature. The total firing cycle was 2½ hours. The resultant films were electrically conductive, and electron diffraction patterns showed the formation of the intermetallic compound NiAl.

Although the above example deals with a particular intermetallic, NiAl, the process is broadly applicable to the formation of other aluminum intermetallics, such as $Ni_3Al$, $TaAl_3$ and PdAl. The process is not limited to aluminum-containing intermetallics, and in similar fashion solutions can be made to give intermetallics such as $Cr_3Si$, $TiB_2$ and the like.

What is claimed is:

1. A process for preparing thin films of the intermetallic compound NiAl which process comprises the steps of coating a substrate stable at temperatures of 500° to about 1000° C. with a solution of a hydrocarbon aluminum compound selected from the group consisting of trialkyl aluminum, dialkyl aluminum hydride and triaryl aluminum and an organo-nickel compound selected from the group consisting of nickel carboxylates having from 10 to 20 carbon atoms in the molecule and nickel sulforesinates and mercaptides having from 8 to about 20 carbon atoms in the molecule in an organic solvent, the aluminum and nickel being present in an atomic ratio of about 1:1, and heating the coated substrate to an elevated temperature in an inert atmosphere to decompose the organo-metallic compounds and to deposit NiAl.

2. The process of claim 1 wherein the heating is effected in a hydrogen atmosphere.

3. The process of claim 1 wherein the hydrocarbon aluminum compound is tri-isohexyl aluminum and the organo-nickel compound is nickel resinate.

(References on following page)

References Cited

UNITED STATES PATENTS

| | | | |
|---|---|---|---|
| 2,755,184 | 7/1956 | Turner et al. | |
| 2,807,532 | 9/1957 | Hahn | 75—82 X |
| 3,036,909 | 5/1962 | Simon | 75—82 X |
| 3,041,197 | 6/1962 | Berger | 117—227 X |
| 3,098,862 | 7/1963 | Kobetz | 117—227 X |
| 3,130,045 | 4/1964 | Richards | 75—144 X |
| 3,141,744 | 7/1964 | Couch et al. | 29—197 X |
| 3,266,912 | 8/1966 | Murphy. | |
| 3,291,642 | 12/1966 | Jung et al. | 75—144 X |

ALFRED L. LEAVITT, *Primary Examiner.*

J. R. BATTEN, Jr., *Assistant Examiner.*

U.S. Cl. X.R.

117—229, 160, 46; 75—68, 82, 134, 144, 170